United States Patent
Moon (10) Patent No.: US 10,527,481 B2
(45) Date of Patent: Jan. 7, 2020

(54) MULTI-PROBE SENDER AND TANK HAVING THE SAME

(71) Applicants: HYUNDAI MOTOR COMPANY, Seoul (KR); KIA MOTORS CORPORATION, Seoul (KR)

(72) Inventor: Kee-Hoon Moon, Hwaseong-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 198 days.

(21) Appl. No.: 15/719,473

(22) Filed: Sep. 28, 2017

(65) Prior Publication Data

US 2018/0136031 A1 May 17, 2018

(30) Foreign Application Priority Data

Nov. 14, 2016 (KR) .......................... 10-2016-0151064

(51) Int. Cl.

| G01F 23/60 | (2006.01) |
|---|---|
| G01F 23/70 | (2006.01) |
| G01F 23/74 | (2006.01) |
| G01F 23/68 | (2006.01) |
| B60K 15/03 | (2006.01) |
| G01F 23/72 | (2006.01) |

(52) U.S. Cl.
CPC .............. *G01F 23/74* (2013.01); *B60K 15/03* (2013.01); *G01F 23/603* (2013.01); *G01F 23/68* (2013.01); *G01F 23/683* (2013.01); *G01F 23/70* (2013.01); *B60K 2015/03217* (2013.01); *G01F 23/72* (2013.01)

(58) Field of Classification Search
CPC .......... G01F 23/74; G01F 23/72; G01F 23/68; G01F 23/683; G01F 23/70
See application file for complete search history.

(56) References Cited

U.S. PATENT DOCUMENTS

| 4,796,472 A | 1/1989 | Lew |
| 5,079,950 A | 1/1992 | McKiernan et al. |
| 5,627,523 A * | 5/1997 | Besprozvanny ........ G01F 23/72 340/612 |
| 5,886,312 A | 3/1999 | Barmore, Jr. et al. |

FOREIGN PATENT DOCUMENTS

| CN | 205190224 U | 4/2016 |
| JP | 8-86684 A | 4/1996 |
| JP | 2001-311653 A | 11/2001 |
| JP | 2003-121245 A | 4/2003 |

* cited by examiner

*Primary Examiner* — Paul M. West (74) *Attorney, Agent, or Firm* — Knobbe, Martens, Olson & Bear LLP (57) ABSTRACT

A multi-probe sender may include a multi-probe having a reed switch arrangement in which reed switches form a level-sensitivity obtaining interval at which a value overlap is prevented in consideration of a resistance-value tolerance range, and having a probe layout forming an intersection interval at which value interference is prevented in consideration of an interval overlap of the reed switches.

13 Claims, 5 Drawing Sheets

| STEP | H-1(mm) | R-1(Ω) | H-2(mm) | R-2(Ω) | H_3(mm) | R-3(Ω) |
|---|---|---|---|---|---|---|
| 1 | | | | | >175 | 240 |
| 2 | 175 | 860 | | | | |
| 3 | | | 171 | 1480 | | |
| 4 | | | | | 167 | 2100 |
| 5 | 163 | 2720 | | | | |
| 6 | | | 159 | 3340 | | |
| 7 | | | | | 155 | 3960 |
| 8 | 151 | 4580 | | | | |
| 9 | | | 147 | 5200 | | |
| 10 | | | | | 143 | 5820 |
| 11 | 139 | 6440 | | | | |
| 12 | | | 135 | 7060 | | |
| 13 | | | | | 131 | 7680 |
| 14 | 127 | 8300 | | | | |
| 15 | | | 123 | 8920 | | |
| 16 | | | | | 119 | 9540 |
| 17 | 115 | 10160 | | | | |
| 18 | | | 111 | 10780 | | |
| 19 | | | | | 107 | 11400 |
| 20 | 103 | 12020 | | | | |
| 21 | | | 99 | 12640 | | |
| 22 | | | | | 95 | 13260 |
| 23 | 91 | 13880 | | | | |
| 24 | | | 87 | 14500 | | |
| 25 | | | | | 83 | 15120 |
| 26 | 79 | 15740 | | | | |
| 27 | | | 75 | 16300 | | |
| 28 | | | | | 71 | 16980 |
| 29 | 67 | 17600 | | | | |
| 30 | | | 63 | 18220 | | |
| 31 | | | | | 59 | 18840 |

MULTI-PROBE SENDER AND TANK HAVING THE SAME

CROSS-REFERENCE TO RELATED APPLICATIONS

This application claims priority to Korean Patent Application No. 10-2016-0151064, filed on Nov. 14, 2016, which is incorporated herein by reference in its entirety.

BACKGROUND

Field

Embodiments of the present invention relate to a sender; and, particularly, to a multi-probe sender and a tank, capable of maintaining a high level of sensitivity without limiting design for a tank shape.

Description of Related Art

In general, a sender that detects a level of fluid remaining in a tank should have sensitivity to a level so as to indicate an accurate volume.

Typically, a sender configured as an independent unit is installed in a fuel tank or an urea tank of the vehicle together with a pump (fuel pump or urea pump), thus allowing a level of fuel or urea in the tank to be accurately detected and displayed.

The disclosure of this section is to provide background of the invention. Applicant notes that this section may contain information available before this application. However, by providing this section, Applicant does not admit that any information contained in this section constitutes prior art.

SUMMARY

An embodiment of the present invention is directed to a multi-probe sender and a tank, in which an interval between reed switches is maintained at 12 mm to prevent a level sensitivity from being lowered, the height of the tank is reduced and the width of the tank is increased, it is possible to design the shape of the tank such that the height of the tank is reduced and the width of the tank is increased, thus making it easy to obtain a vehicle ground clearance and allowing a tank volume to be very effectively adjusted as compared to a tank having the same volume.

Other aspects and advantages of the present invention can be understood by the following description, and become apparent with reference to the embodiments of the present invention. Also, it is obvious to those skilled in the art to which the present invention pertains that the aspects and advantages of the present invention can be realized by the means as claimed and combinations thereof.

In accordance with an embodiment of the present invention, there is provided a multi-probe sender including a probe configured such that reed switches are arranged in a reed switch arrangement forming a level-sensitivity obtaining interval at which a value overlap is prevented in consideration of a resistance-value tolerance range, and a multi-probe configured such that the probe is divided into first, second and third probes and the first, second and third probes are combined with each other in a probe layout forming an intersection interval at which value interference is prevented in consideration of an interval overlap of the reed switches.

First, second and third positioning holes may be penetrated into the magnetic float, thus forming a through hole, and the first, second and third probes may be positioned in the first, second and third positioning holes, respectively.

The first, second and third probes may be coupled with the first, second and third positioning holes that may be at an angular interval of 120° relative to each other to define a circular shape, thus forming a combination.

The multi-probe sender may further include a magnetic float moving up and down along the multi-probe, a head to which a fixer may be secured, the fixer being coupled to the multi-probe, and a supporter coupled to the head.

The supporter may be coupled to the head, and may be formed in an "L" shape.

In accordance with another embodiment of the present invention, there is provided a tank having a multi-probe sender including a multi-probe such that first, second and third probes having reed switches, respectively, are combined with each other at an intersection interval between the reed switches to form a level-sensitivity obtaining interval between the reed switches, a magnetic float moving up and down along the multi-probe, a head to which a fixer is secured, the fixer being coupled to the multi-probe, and a supporter coupled to the head, wherein the multi-probe sender may be vertically installed towards a bottom of an internal space that may be filled with liquid, and the tank may have the shape of a rectangular parallelepiped such that a height of tank may be smaller than a width thereof.

A detection value of the multi-probe sender may be transmitted to a cluster display that may be connected via a cable connector to display a flow level. The liquid in the internal space may be pumped up by a pump and then discharged out from the internal space.

The tank of the present invention is equipped with the multi-probe sender, thus realizing the following operational effects.

First, the interval between the reed switches is maintained at 12 mm to prevent a level sensitivity from being lowered and prevent the overlap of resistance values, and the length of the probe is reduced to about a half of that of the existing probe. Second, as the length of the probe is reduced to about a half of that of the existing probe, the interval of 12 mm between the reed switches is compensated for by the number of probes, thus minimizing the structural change and the number of components of the sender. Third, since the length of the probe is reduced to about a half of that of the existing probe, it is possible to overcome limitation on designing the shape of the tank. Fourth, since limitation on designing the shape of the tank is overcome, the tank may be manufactured such that its height is reduced and its width is increased, thus allowing a tank volume to be very effectively adjusted as compared to a tank having the same volume. Fifth, the tank shaped such that its height is reduced and its width is increased makes it easy to obtain a vehicle ground clearance and enhances the degree of freedom in terms of a package for the purpose of vehicle mountability.

DESCRIPTION OF EMBODIMENTS

Embodiments of the present invention will be described below in more detail with reference to the accompanying drawings so as to be easily realized by those skilled in the art.

The present invention may, however, be embodied in different forms and should not be construed as limited to the embodiments set forth herein. In certain embodiments, irrelevant to the present invention may be omitted to avoid obscuring appreciation of the disclosure. Throughout the disclosure, like reference numerals refer to like parts throughout the various figures and embodiments of the present invention.

The drawings are not necessarily to scale and in some instances, proportions may have been exaggerated in order to clearly illustrate various layers and regions of the embodiments. It will be understood that when an element such as a layer, a film, a region, or a plate is referred to as being "above" another element, it can be "immediately above" the other element or intervening elements may also be present.

In contrast, when an element is referred to as being "immediately above" another element, there are no intervening elements present. In addition, it will be understood that when an element is referred to as being "entirely" formed on another element, it can be formed on the entire surface (or whole surface) of the other element or cannot be formed at a portion of the edge thereof.

Typically, a sender is configured in combination with a magnetic floater, and the floater is equipped with a probe in which reed switches are arranged at predetermined intervals in view of the level sensitivity so as to indicate a volume based on a resistance value delivered by a change in height. Therefore, signals having different resistance values of the reed switches may be transmitted to a cluster controller of a vehicle in view of a change in flow level, and then an associated fuel amount may be displayed.

However, the sender is problematic in that the volume is displayed based on the resistance values delivered from the reed switches of the probe in view of the change in height of the floater, so that the level sensitivity can be obtained by the number of the reed switches, and a sufficient long probe may be required to obtain a desired number of reed switches, and consequently the design for the shape of the applied tank may be inevitably limited.

By way of example, the procurement of the level sensitivity of the sender requires a reed-switch interval of about 12 mm matching with 1.3 liters so as to prevent a value overlap in consideration of a resistance-value tolerance range. When the sender having the reed-switch interval of 12 mm is applied to the tank having the volume of 40 liters, the reed-switch arrangement length of about 372 mm is required by the reed-switch interval of 12 mm with about 31 steps. Thus, the overall sender length including a residual-flow permissible length (a state in which a flow level is indicated as zero but some flow actually remains in the tank) requires about 468 mm, and the height of the tank should be increased instead of reducing the width of the tank for the same volume by designing the shape conforming to the overall sender length of about 468 mm.

Consequently, the tank equipped with the sender having an overall length of about 468 mm has a relatively high height, so that it is limited in the degree of freedom in terms of a package for a vehicle and particularly in the degree of freedom in terms of a vehicle ground clearance.

Moreover, an ultrasonic leveling method may be applied to overcome limitation on designing the shape of the tank due to a magnetic float type sender, but the use of an ultrasonic leveling type tank is limited due to the chemical properties of solution in the tank. Particularly, since this is significantly affected by bubbles in the tank, it is difficult to obtain reliability due to the frequent occurrence of errors in a detection level.

Figure 1:
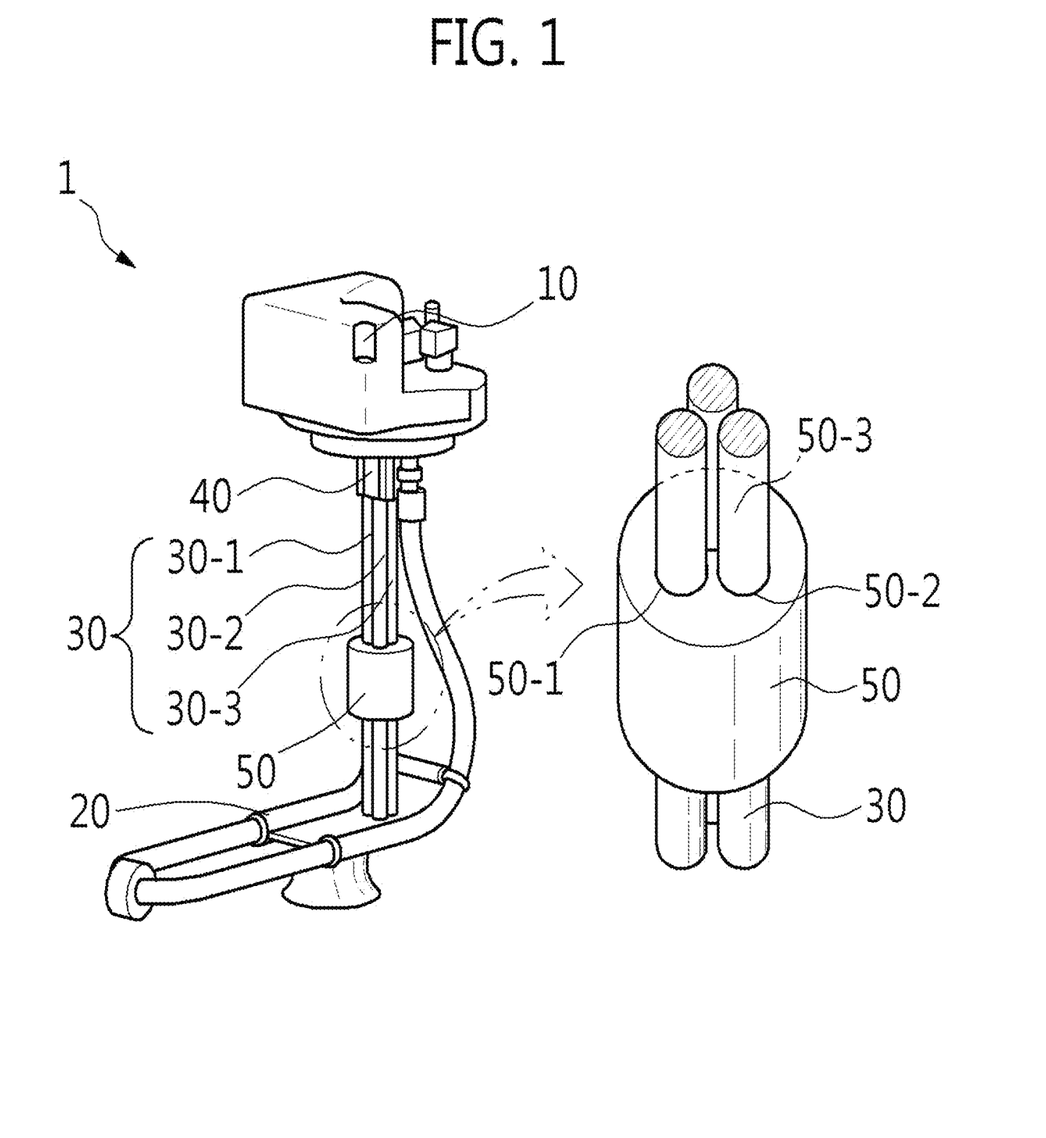
FIG. 1 is a view illustrating the configuration of a multi-probe sender according to embodiments of the present invention.

Referring to FIG. 1, a multi-probe sender or level detector 1 is configured such that a head 10 and a supporter 20 are provided as a coupling means, and a multi-probe 30, a fixer 40 and a magnetic float 50 are provided as a level detection means.

To be more specific, the head 10 has electrical components composed of electrical elements for generating and sending electrical signals as internal components, and has a sender housing that has on an outer circumference thereof threads to be detachably mounted to a fastening component (e.g., tank) as external components. The supporter 20 has a pipe structure connected to the head 10 to protect an end of the multi-probe 30 while preventing the head 10 in an assembled state from being shaken due to disturbance. By way of example, the pipe structure takes an "L" shape.

Thus, the head 10 and the supporter 20 constituting the coupling means are the same as components of a general sender.

In detail, the multi-probe 30 is composed of three probes, namely, first, second and third probes or sensor bars 30-1, 30-2 and 30-3. Each of the first, second and third probes 30-1, 30-2 and 30-3 is of a reed switch arrangement length having first, second and third reed switches 31, 32 and 33 (see FIG. 2) generating resistance values. The fixer 40 fixes one end of the multi-probe 30 and then is coupled with the head 10. The magnetic float 50 has a permanent magnet therein, is coupled to the multi-probe 30 to move up and down along the multi-probe 30, and has first, second and third positioning holes 50-1, 50-2 and 50-3 in which the first, second and third probes 30-1, 30-2 and 30-3 are located, respectively, when the magnetic float is coupled with the multi-probe 30. The first, second and third positioning holes 50-1, 50-2 and 50-3 form a semi-circle at an angular interval of 120° while sharing a central hole.

Thus, the multi-probe 30 constituting the level detection means is shorter in length than the probe applied to the typical sender, by using the arrangement of the first, second and third probes 30-1, 30-2 and 30-3. Particularly, the short length of the multi-probe 30 significantly increases a degree of freedom for designing the tank to which the multi-probe sender 1 is to be applied.

Figure 2:
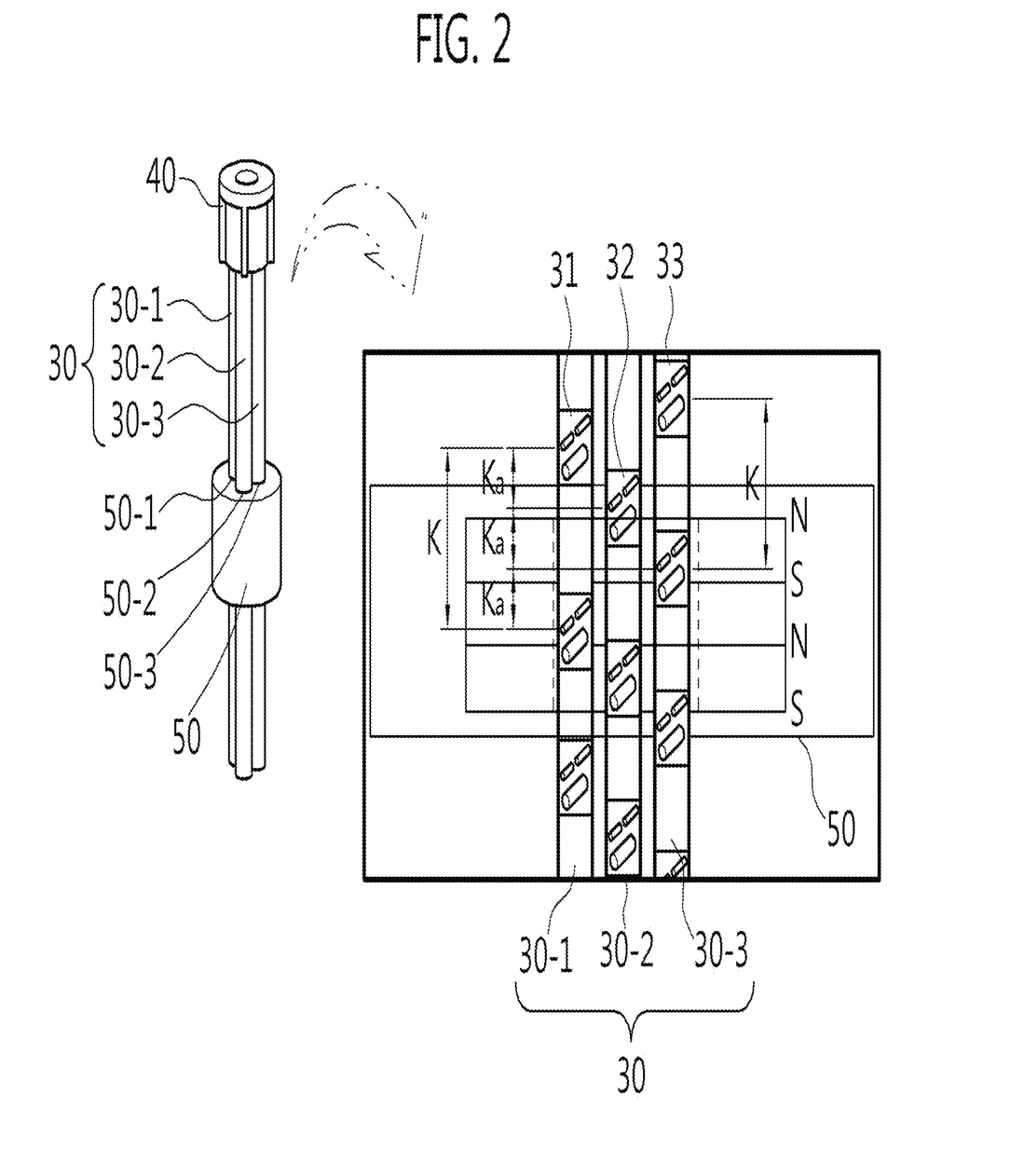
FIG. 2 is a view illustrating the detailed configuration of a multi-probe having three probes and a magnetic float according to embodiments of the present invention.

Referring to FIG. 2, the first, second and third probes 30-1, 30-2 and 30-3 constituting the multi-probe 30 have the first, second and third reed switches 31, 32 and 33, and are positioned in the first, second and third positioning holes 50-1, 50-2 and 50-3 of the magnetic float 50, respectively.

By way of example, the coupling of the multi-probe 30 with the magnetic float 50 causes the first probe 30-1 to be positioned in the first positioning hole 50-1, causes the second probe 30-2 to be positioned in the second positioning hole 50-2, and causes the third probe 30-3 to be positioned in the third positioning hole 50-3. In this case, the first, second and third probes 30-1, 30-2 and 30-3 are located in the first, second and third positioning holes 50-1, 50-2 and 50-3, respectively, such that they are not in contact with each other. Consequently, the magnetic float 50 surrounds the first, second and third probes 30-1, 30-2 and 30-3 with a permanent magnet, and uses each of the first, second and third probes 30-1, 30-2 and 30-3 as a resistance detection surface reacting with the permanent magnet while moving up and down along the multi-probe 30.

By way of example, as the magnetic float 50 vertically moves up and down along the multi-probe 30, each of the first, second and third probes 30-1, 30-2 and 30-3 serves as the resistance detection surface of the permanent magnet, thus generating different resistance values depending on a change in position of the permanent magnet.

By way of example, each of the first, second and third reed switches 31, 32 and 33 creates reed-switch arrangement at an interval K for obtaining a level sensitivity within the reed-switch arrangement length, and simultaneously each of the first, second and third probes 30-1, 30-2 and 30-3 creates a probe layout such that the first, second and third reed switches 31, 32 and 33 have intersection intervals Ka therebetween. Here, the interval K for obtaining the level sensitivity prevents value overlap in consideration of a resistance-value tolerance range in the first, second and third reed switches 31, 32 and 33, and the intersection interval Ka prevents value interference in consideration of interval overlap between the first, second and third reed switches 31, 32 and 33.

The reed-switch arrangement forms the interval K for obtaining the level sensitivity. By way of example, a plurality of first reed switches 31 is continuously arranged at the level-sensitivity obtaining interval K along the overall length of the first probe 30-1. A plurality of second reed switches 32 is continuously arranged at the level-sensitivity obtaining interval K along the overall length of the second probe 30-2. A plurality of third reed switches 33 is continuously arranged at the level-sensitivity obtaining interval K along the overall length of the third probe 30-3.

The probe layout forms an intersection interval Ka. The intersection interval Ka is a length that is made by dividing the level-sensitivity obtaining interval K into three equal parts. By way of example, an intersection interval Ka is defined between the level-sensitivity obtaining interval K of the second probe 30-2 and the level-sensitivity obtaining interval K of the first probe 30-1, and an intersection interval Ka is also defined between the level-sensitivity obtaining interval K of the second probe 30-2 and the level-sensitivity obtaining interval K of the third probe 30-3.

Consequently, the first, second and third probes 30-1, 30-2 and 30-3 have the first, second and third reed switches 31, 32 and 33, respectively, which form the level-sensitivity obtaining interval K with the intersection intervals Ka, so that the resistance value is generated by the change in position of the permanent magnet of the magnetic float 50 without the value overlap. By way of example, if the permanent magnet of the magnetic float 50 is located in the first reed switch 31 of the first probe 30-1 so that the first reed switch 31 is used as the resistance detection surface, the second reed switches 32 of the second probe 30-2 are spaced apart from each other by a twofold intersection interval (Ka+Ka), and simultaneously the third reed switches 33 of the third probe 30-3 are spaced apart from each other by the intersection interval Ka. Thus, since the second and third reed switches 32 and 33 are not located at the resistance detection surface of the permanent magnet, the resistance value is generated only in the first reed switch 31 of the first probe 30-1.

Figure 3:
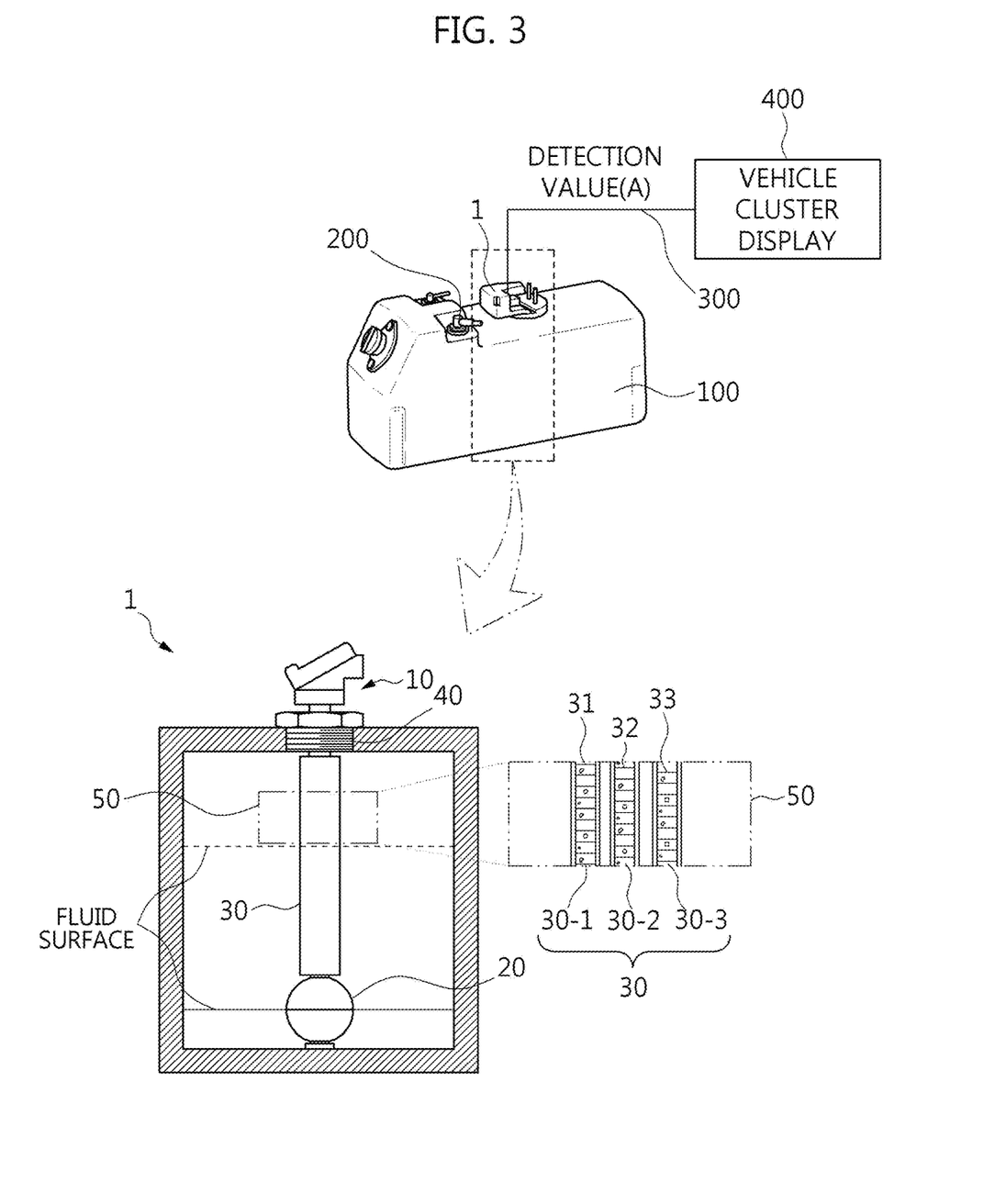
FIG. 3 is a view illustrating a state in which a flow level is detected from a tank equipped with the multi-probe sender according to embodiments of the present invention.
Figure 4:
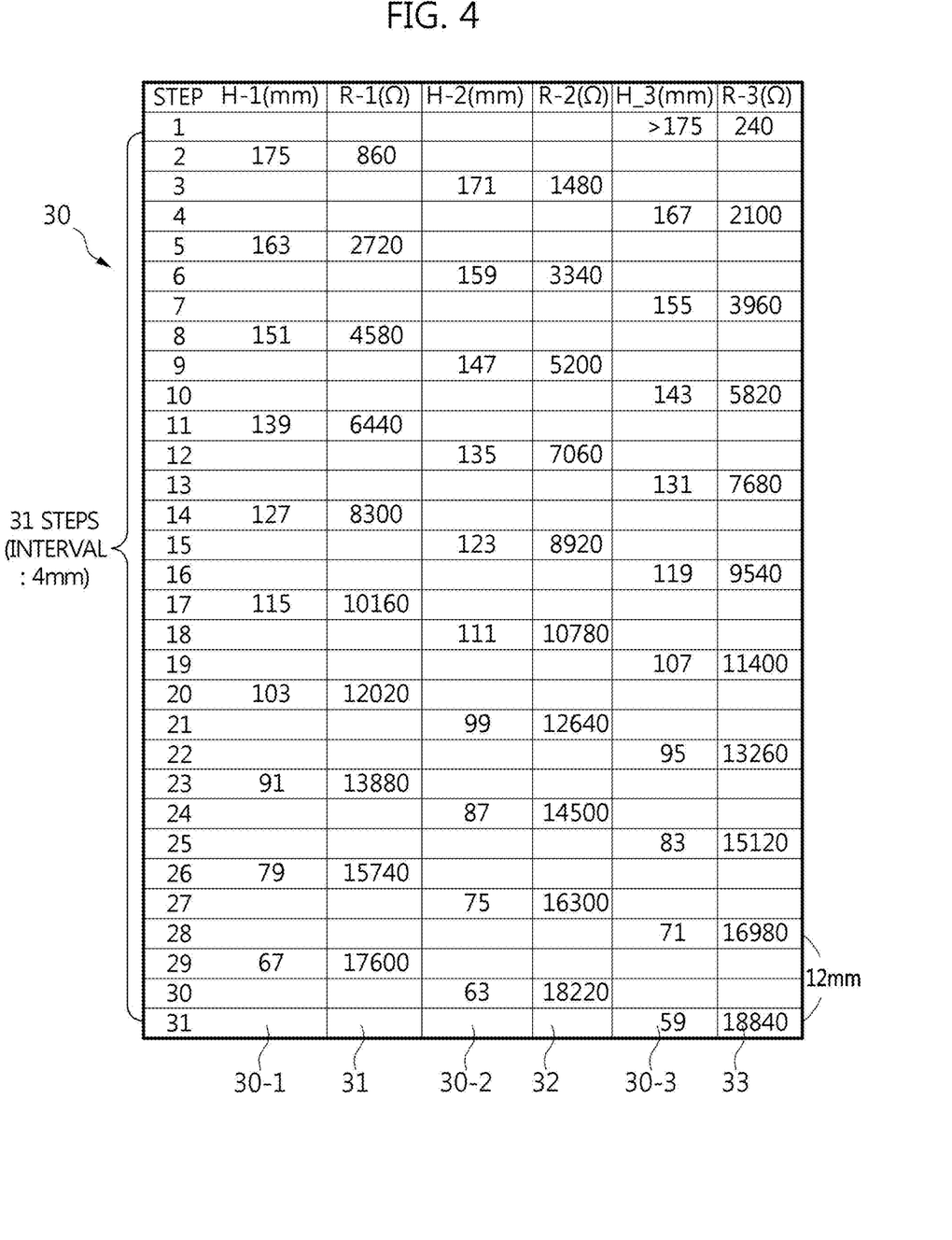
FIG. 4 is an example of a table showing 31 detection levels when three probes constituting the multi-probe according to embodiments of the present invention generate different resistance values for 4 mm steps at intervals of 12 mm reed switches.
Figure 5:
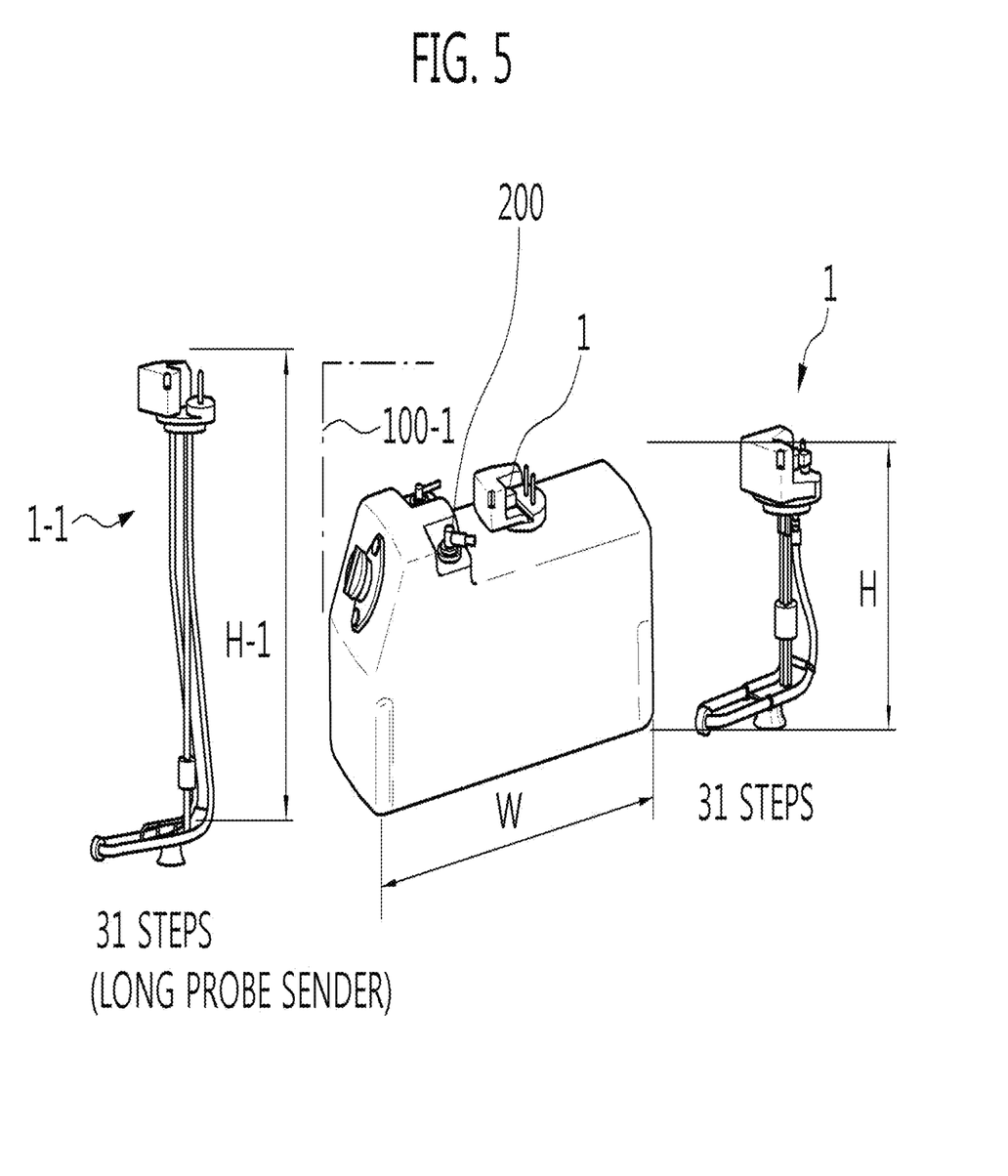
FIG. 5 is an example of shape design of the tank equipped with the multi-probe sender according to embodiments of the present invention.

FIGS. 3 to 5 illustrate a tank 100 having a volume of 40 L (liters) to which the multi-probe sender 1 is applied. In this case, the tank 100 is employed as a fuel tank for a vehicle or a urea water tank, but the multi-probe sender 1 may be applied to all kinds of tanks requiring the same application without being limited to a specific kind of tank.

Referring to FIG. 3, the tank 100 includes a pump 200 that pumps fuel (or urea water) filled therein, and the multi-probe sender 1. The multi-probe sender 1 is connected to a cable connector 300 coupled with a cluster display 400 of the vehicle, thus allowing the flow level of the tank 100 to be checked through the cluster display 400.

To be more specific, the multi-probe sender 1 is the same component as the multi-probe sender 1 described with reference to FIGS. 1 and 2. However, each of the first, second and third probes 30-1, 30-2 and 30-3 constituting the multi-probe 30 of the multi-probe sender 1 is implemented to conform to the tank 100 having the volume of 40 L.

Referring to a specific example of FIG. 4, the first, second and third reed switches 31, 32 and 33 are arranged at the reed-switch interval of 12 mm matching with 1.3 liters to obtain the interval K for level sensitivity, and simultaneously are provided along the reed-switch arrangement length of the first, second and third probes 30-1, 30-2 and 30-3 such that the intersection interval Ka is set to be a step of 4 mm. Consequently, the first, second and third probes 30-1, 30-2 and 30-3 may be combined with each other to form a total of 31 detection levels with the reed-switch arrangement length of about 120 mm (12 mm×10 step) when 11 detection levels divided into each other at 12 mm are applied.

Thus, if a 31st detection level that is at a lowermost location starts at the height of 59 mm of the third probe 30-3, a $30^{th}$ detection level starts at the height of 63 mm of the second probe 30-2, and a $29^{th}$ detection level starts at the height of 67 mm of the first probe 30-1, each of the first, second and third probes 30-1, 30-2 and 30-3 includes 120 mm as well as a residual-flow permissible length (a state in which a flow level is indicated as zero but some flow actually remains in the tank) of about 60 mm or less, so that the probe may have the overall length of about 180 mm.

Consequently, in the state where the multi-probe 30 is manufactured such that overall sender length is about 180 mm in proportion to the first, second and third probes 30-1, 30-2 and 30-3 having the length of 120 mm, and the value overlap is prevented in consideration of the resistance-value tolerance range at the reed switch interval of 12 mm, it is possible to check the residual flow of the tank 100 at 31 detection levels.

Turning back to FIG. 3, if the magnetic float 50 coupled with the multi-probe 30 is located at the height of a fluid surface and the permanent magnet forms a resistance detection surface with any one of the first, second and third reed switches 31, 32 and 33 of the first, second and third probes 30-1, 30-2 and 30-3, the multi-probe sender 1 generates the detection value A and sends it via the cable connector 300 to the cluster display 400.

By way of example, if the permanent magnet of the magnetic float 50 uses the first lead switch 31 of the first probe 30-1 as the resistance detection surface (see FIG. 2), and the resistance detection surface is located in the first reed switch 31 located at a fifth level of 31 detection levels (see FIG. 4), the second reed switch 32 of the second probe 30-2 and the third reed switch 33 of the third probe 30-3 do not form the resistance detection surface along with the permanent magnet of the magnetic float 50.

Consequently, the first reed switch 31 that is at a $5^{th}$ location among the first reed switches 31 provided on the first probe 30-1 generates a resistance value of 2720Ω corresponding to a $5^{th}$ detection level. The resistance value is converted into the detection value A in the head 10 and then is transmitted via the cable connector 300 on the cluster display 400, thus allowing a driver to confirm the flow level of the tank 100.

Referring to FIG. 5, the multi-probe sender 1 is installed vertically from on a top of the tank 100 towards a bottom thereof. Thus, the tank 100 having the volume of 40 L to which the multi-probe sender 1 is applied instead of a long probe sender 1-1 is reduced to a height H of the multi-probe tank as compared to a height H–1 of the long probe tank resulting from the long probe sender 1-1 of a height tank 100-1, and the tank is designed such that a width W of the tank is increased by a difference between the height H–1 of the long probe tank and the height H of the multi-probe tank.

For example, as in the specific example of FIG. 4, when comparing the multi-probe sender 1 that implements 31 detection levels having the reed-switch interval of 12 mm with the three first, second and third probes 30-1, 30-2 and 30-3 with the long probe sender 1-1 that implements 31 detection levels having the reed-switch interval of 12 mm with one long probe, the long probe sender 1-1 has the overall sender length of about 468 mm with the reed-switch arrangement length of about 372 mm, whereas the multi-probe sender 1 has the overall sender length of about 180 mm with the reed-switch arrangement length of 120 mm of the first, second and third probes 30-1, 30-2 and 30-3. As a result, the length may be reduced to about 40% or less.

Therefore, the tank 100 has a reduced height H corresponding to the length of the multi-probe sender 1, so that the tank has the shape of a rectangular parallelepiped whose length is larger than height when the tank height H is set as the y-axis and the tank width W is set as the x-axis in a coordinate system of x, y and z.

Consequently, when the tank 100 that is small in height and large in width and has the volume of 40 L is applied to a vehicle, the degree of freedom in terms of a package for the vehicle and the degree of freedom in terms of a vehicle ground clearance are significantly increased due to the relatively low height of the tank.

As described above, the multi-probe sender 1 according to this embodiment includes the multi-probe 30 having the reed switch arrangement in which the reed switches 31, 32 and 33 located continuously along the length of the first, second and third probes 30-1, 30-2 and 30-3, respectively, form the level-sensitivity obtaining interval K that prevents the value overlap in consideration of the resistance-value tolerance range, and having the probe layout forming the intersection interval Ka at which the value interference is prevented in consideration of the interval overlap of the reed switches 31, 32 and 33 when the first, second and third probes 30-1, 30-2 and 30-3 are combined with each other. Therefore, when the multi-probe sender is applied to the tank 100, the degree of freedom is guaranteed upon designing the tank such that the height of the tank 100 may be reduced and the width of the tank may be increased, in addition to achieving a precise level detecting performance, thus providing a vehicle ground clearance and considerably improving the adjustment of the tank volume.

In embodiments, a liquid level detector 1 includes plural sensor bars. In the illustrated embodiments, three sensor bars 30-1, 30-2 and 30-3 are provided. The sensor bars extend substantially parallel to one another and along the vertical direction. Each of the sensor bars 30-1, 30-2 or 30-3 includes a plurality of magnetic reed switches 31, 32 or 33. The reed switches in each sensor bar are distributed along its longitudinal direction at a substantially regular interval such that each reed switch can indicate its height along the vertical direction.

A floater 50 has holes in each of which one of the sensor bars is inserted. The floater 50 can move along the longitudinal direction when the liquid level changes. The floater 50 includes a magnet that can make one of the reed switches turn on when the magnet is located adjacent the reed switch. In the illustrated embodiments, when the magnet is located at substantially the same level or height with the reed switch, the reed switch is turned on.

The reed switches 31, 32 and 33 are distributed in the sensor bars 30-1, 30-2 and 30-3 such that one of the reed switches 31, 32 and 33 does not overlap other reed switches when viewed in a viewing direction perpendicular to the longitudinal direction. In embodiments, one reed switch 31 in the sensor bar 30-1 is located between two immediately neighboring reed switches 32 of the sensor bar 30-2 and is located between two immediately neighboring reed switches 33 of the sensor bar 30-3 when viewed in the viewing direction. Likewise, one reed switch 32 in the sensor bar 30-2 is located between two immediately neighboring reed switches 31 of the sensor bar 30-1 and is located between two immediately neighboring reed switches 33 of the sensor bar 30-3 when viewed in the viewing direction. Also, one reed switch 33 in the sensor bar 30-3 is located between two immediately neighboring reed switches 32 of the sensor bar 30-2 and is located between two immediately neighboring reed switches 31 of the sensor bar 30-1 when viewed in the viewing direction. Further, two immediately neighboring reed switches in each sensor bar are sufficiently spaced from each other such that only one of the two immediately neighboring reed switches can be turned on by the adjacently-located magnet of the float 50 while the other maintains turned off.

In embodiments, when one of the reed switches of one sensor bar is on, the sensor bar can generate and transmit an electric signal or a resistance value indicative of the location or height of the reed switch. Thus, the location of the magnet (or the float 50) can be detected by processing the electric signal or the resistance value in an electric circuit. In embodiments, such electric signal or resistance value is alternatingly generated from the three sensor bars 30-1, 30-2 and 30-3. In embodiments, when the magnet (or the float 50) is at a certain height, only one among the reed switches in the sensor bars 30-1, 30-2 and 30-3 is on. However, the invention is not limited thereto. In some embodiments, when the magnet is located at a certain height, one of the reed switches in one of the sensor bars (for example, sensor bar 30-1) and one of the reed switches is another sensor bar (for example, sensor bar 30-2) are on. In embodiments, when the magnet is located at a certain height, one of reed switches in each of all the sensor bars 30-1, 30-2 and 30-3 is on without turning on two reed switches in the same sensor bar.

While embodiments of the present invention have been described, it will be apparent to those skilled in the art that various changes and modifications may be made without departing from the spirit and scope of the invention as defined in the following claims.

What is claimed is:

1. A multi-probe sender comprising:
   a multi-probe having a reed-switch arrangement in which
   reed switches form a level-sensitivity obtaining interval at which a value overlap is prevented in consideration of a resistance-value tolerance range, and having a probe layout forming an intersection interval at which value interference is prevented in consideration of an interval overlap of the reed switches, wherein the multi-probe comprises three probes, including first, second and third probes each having the reed switches, and a combination of the first, second and third probes form the probe layout, wherein the multi-probe is coupled with a magnetic float moving up and down along the first, second and third probes, and the magnetic float is provided with a permanent magnet that forms a resistance detection surface along with each of the reed switches, wherein first, second and third positioning holes are penetrated into the magnetic float, thus forming through holes, and the first, second and third probes are positioned in the first, second and third positioning holes, respectively.

2. The multi-probe sender of claim 1, wherein the reed-switch arrangement is formed on the probe, and the probe layout is applied to a probe combination.

3. The multi-probe sender of claim 1, wherein each of the first, second and third probes form the reed-switch arrangement.

4. The multi-probe sender of claim 1, wherein the combination is formed such that the first, second and third probes are at an angular interval of 120° relative to each other.

5. The multi-probe sender of claim 1, wherein the first, second and third positioning holes are at an angular interval of 120° relative to each other.

6. The multi-probe sender of claim 1, wherein the multi-probe is coupled with a head, and the head transmits a resistance detection value of the corresponding reed switch depending on a change in position of the magnetic float to an outside.

7. The multi-probe sender of claim 6, wherein a fixer is provided on a junction between the multi-probe and the head, and the fixer fixes the multi-probe and then couples the multi-probe with the head.

8. A tank comprising:
the multi-probe sender of claim 1;
the magnetic float moving up and down along the multi-probe;
a head to which a fixer is secured, the fixer being coupled to the multi-probe; and
a supporter coupled to the head,
wherein the multi-probe sender is vertically installed towards a bottom of an internal space that is to be filled with liquid.

9. The tank of claim 8, wherein a width of the tank is greater than a height of the tank.

10. The tank of claim 8, wherein a detection value of the multi-probe sender is transmitted to a cluster display configured to display a flow level.

11. The tank of claim 10, wherein the multi-probe sender is connected with the cluster display via a cable connector.

12. The tank of claim 8, wherein a pump is provided in the internal space to pump up the liquid and then discharge the liquid out from the internal space.

13. The tank of claim 12, wherein the liquid comprises fuel or urea water.

* * * * *